Dec. 5, 1939.　　　J. L. SHROYER　　　2,182,682
FOOD WARMING TABLE
Filed Dec. 8, 1936　　　2 Sheets-Sheet 2
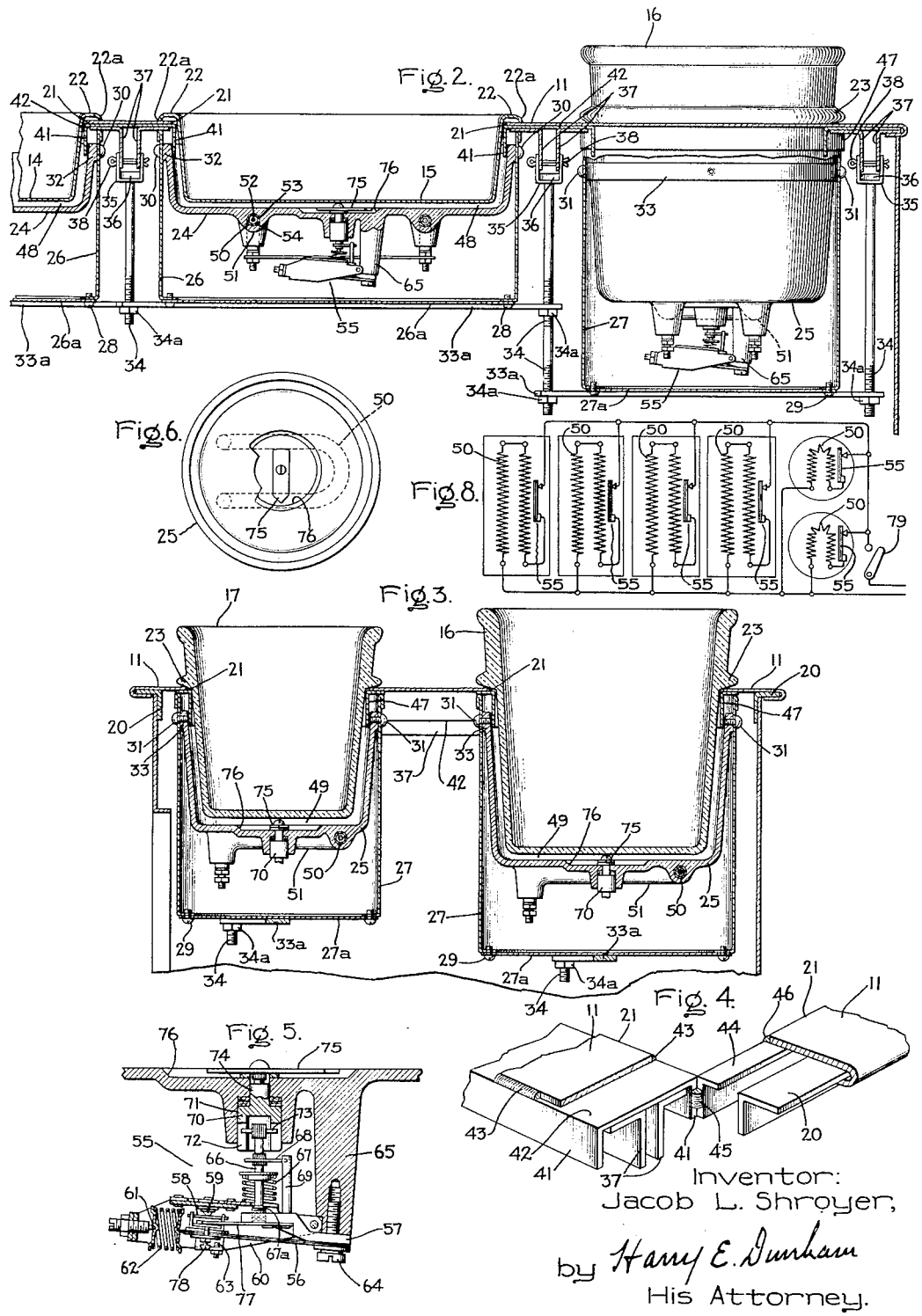
Inventor:
Jacob L. Shroyer,
by Harry E. Dunham
His Attorney.

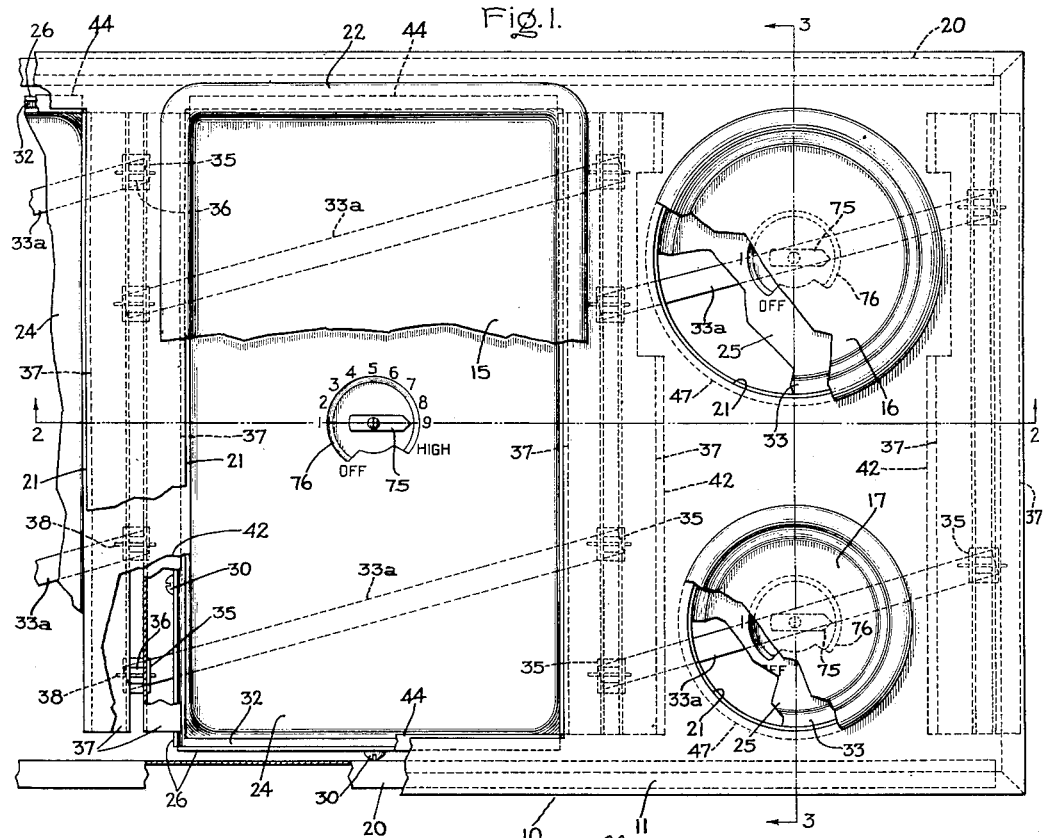
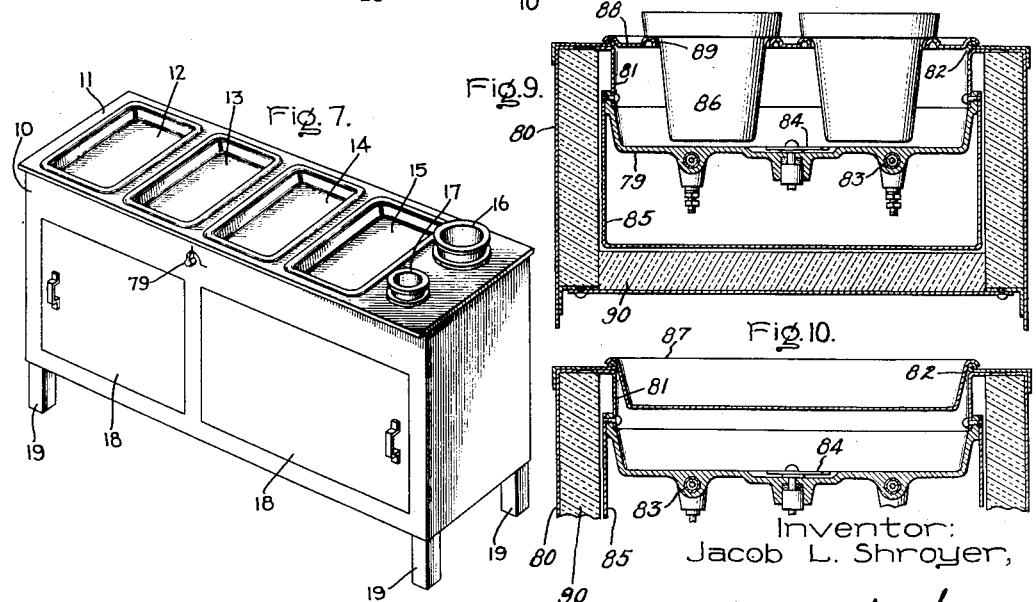

Patented Dec. 5, 1939

2,182,682

UNITED STATES PATENT OFFICE 2,182,682

FOOD WARMING TABLE

Jacob L. Shroyer, Oak Park, Ill., assignor, by mesne assignments, to Edison General Electric Appliance Company, Incorporated, a corporation of New York Application December 8, 1936, Serial No. 114,788

11 Claims. (Cl. 219—19)

This invention relates to food warming tables, more particularly to tables for warming cooked edibles to keep them in a palatable heated condition, and it has for its object the provision of an improved device of this character.

This invention has general application in the warming of foods, but it is particularly applicable to warming tables for cafeterias, lunch counters, restaurants, hotels and the like, where foods, such as meats, soups, vegetables, gravies, etc., are prepared in large quantities and kept warm for serving in relatively small amounts from time to time as demanded by the customers.

Heretofore, the type of food warming table generally used is the "steam" table. This table has a pan of water usually extending the full length of the table, and food containers fitted into holes in a cover over the pan so as to be supported above the water level. The steam generated by heating the water to the boiling point envelops the food containers to keep them warm. Generally gas is the source of heat for the table.

These tables have several objections; the temperatures ranging from 200° F. to 212° F. are entirely too high for the proper preservation of food. Moreover, different warming temperatures are desirable for different foodstuffs to keep each in its most palatable condition. This result cannot be obtained in the steam heated table where the temperatures of all the food containers are substantially the same.

Another serious objection is that steam escapes from the table thereby increasing the humidity in the room where the table is located, oftentimes to an uncomfortable degree. The escaping steam also, at times, condenses on fixtures and other decorations with deteriorating results.

Attempts have been made heretofore to heat warming tables electrically, but all have failed in that they have not obtained even uniform temperatures of the food receptacles. Moreover, when attempts were made to use electric heating elements having sufficient wattage input to provide enough heat under conditions of heavy service, it was found that excessively high food temperatures resulted during periods of light intermittent service.

This invention contemplates the provision of an improved electrically heated warming table having means for obtaining the most desirable temperatures for the particular foods, and holding these temperatures at substantially constant values. Moreover, this invention has as an object the provision of improved electric heating means uniformly distributing the heat energy to the bottom and side walls of the food receptacles to heat these walls to substantially uniform temperatures, and holding these temperatures, irrespective of the rate of service of the food from the receptacles.

In accordance with this invention, a separate electrically heated insert is provided for each food receptacle below the opening in the top wall provided for the receptacle. Each insert is formed substantially in the shape of that portion of the receptacle extending below the table top, and it is relatively massive to insure a uniform heat distribution to the associated food container. To further insure a uniform distribution of heat, the insert is spaced somewhat from the container so as to provide a relatively thin air space between these members. Each insert has its own temperature control, whereby each may have and hold the most suitable temperature for the food in its receptacle.

The heating inserts, as well as their heating elements and temperature control, preferably are arranged in a suitable casing provided for them, and the casing is suspended from the table top to support the inserts in proper relation to the food receptacles.

For a more complete understanding of this invention, reference should be had to the accompanying drawings, in which Fig. 1 is a fragmentary plan view of a warming table embodying this invention, parts being broken away so as to illustrate certain details of construction; Fig. 2 is a sectional view taken through the line 2—2 of Fig. 1 and looking in the direction of the arrows; Fig. 3 is a sectional view taken through the line 3—3 of Fig. 1 and looking in the direction of the arrows; Fig. 4 is a fragmentary perspective view of a portion of the warming table of Figs. 1, 2, and 3, parts being broken away to illustrate certain details of construction; Fig. 5 is a fragmentary view illustrating a portion of a heating insert used in the warming table of Figs. 1 to 4, and having temperature control means arranged in accordance with this invention; Fig. 6 is a top plan view of the heating insert used in the warming table of this invention; Fig. 7 is a perspective view illustrating the warming table of this invention; Fig. 8 is a diagrammatic representation of the warming inserts, heating means therefor and temperature control means provided for the heating means; and Figs. 9 and 10 are elevations in section illustrating a modified form of this invention.

Referring more particularly to Figs. 1 to 8, this invention has been shown as applied to a warming table particularly adapted for use in cafeterias, restaurants, hotels, cafes, and the like. As shown, the warming table comprises a cabinet 10 having a top wall 11 which is arranged to support a plurality of food containers or inserts 12–17, inclusive. The food receptacles 12, 13, 14, and 15, as shown, are relatively flat and are intended to receive meats, vegetables, and the like. These members may have any suitable shape, but, as shown, have the shape of relatively flat rectangular pans. The receptacles 16 and 17 preferably will be of cylindrical form and are relatively deep. These receptacles are intended to receive gravy, soups and the like. The cabinet 10 is provided with front doors 18 whereby access may be had to the interior of the cabinet; and it is supported in an elevated position by means of legs 19 arranged at the corners.

The top wall 11 is secured to the upper edges of the side walls of the cabinet by means of suitable angle members 20. The members 20 have one side or flange positioned inside of the side walls of the cabinet, and these flanges are rigidly secured to the side walls in any suitable manner as by welding, while the other flanges project outwardly over the upper edges of the side walls and are secured to the top wall 11 in any suitable manner as by welding. As shown, the outer side edges of the top wall are folded over the outwardly extending flanges, as clearly shown in Figs. 3 and 4, the top and bottom sides of the folds being welded to the flanges. It will be understood that the top wall will be formed of a relatively thin sheet so that it can be folded over the flanges. The angle members 20 materially reenforce the connection between the cabinet and the top plate 11.

The top plate 11 is provided with a plurality of apertures 21 through which the receptacles 12–17 are inserted. These apertures, as shown, have substantially the same shape as the cross-sections of the food containers that they receive; that is, they are rectangular and circular, as shown in Fig. 1. As shown more clearly in Fig. 2, the pans 12–15 have their upper edges curled over, as indicated by the numeral 22, the receptacles being so proportioned with reference to their openings 21 that the outer edges 22a of the curled portions 22 rest upon the table top 11 about the openings so as to suspend the pans from the table top, with the side walls of the pans out of contact with the edges of the openings.

The cylindrical receptacles 16 and 17 are supported in a somewhat different manner. In this case, a substantial portion of the receptacles 16 and 17 project above the top plate 11, and the receptacle is supported by a bead or rim 23 between the top and bottom, as shown, and bearing on the edge of the opening 21 receiving the receptacle.

The food receptacles 12–17 are heated by suitable electrically heated inserts, those provided for the pans 12–15 being designated by the numeral 24 and those for the receptacles 16 and 17 by the numeral 25. These inserts have substantially the same construction, but are given shapes corresponding to the bottom and side walls of the associated receptacles that project downwardly through the openings 21 in the top wall 11, as clearly shown in Figs. 2 and 3 so as to constitute, in effect, heated recesses for the various food receptacles. The heating bodies or inserts 24 and 25 are formed of a suitable metal having a relatively good heat conductivity, such as aluminum, and are formed with relatively massive walls, as indicated in the drawings. The inserts 24 and 25 are mounted in suitable casings 26 and 27, respectively, which, as shown, have in general the shape of the inserts they receive. The casings have removable bottom walls 26a and 27a respectively secured by suitable screw fastening means 28 and 29, respectively, the lower edges of the side walls of the casings being provided with inturned flanges, as shown, to receive the screw fastening means. The inserts are secured to the casings by means of suitable screw fastening means 30 and 31, respectively, the upper edges of the inserts being provided with outwardly extending circular flanges 32 and 33, respectively, bearing against the inner surfaces of the side walls and receiving the screw fastening means. As shown, the upper edges of the inserts are spaced somewhat below the upper edges of the corresponding casings 26, 27.

The casings 26 and 27 are suspended from the top wall 11 so as to hold the inserts 24 and 25 in proper relation with reference to their food receptacles. For this purpose, suitable supporting straps or plates 33a are provided in pairs beneath the casings, as shown in Figs. 1 and 2. These plates at their ends are secured to suitable supporting rods 34. These rods 34 at their upper ends are suspended from the top wall 11 and at their lower ends are provided with threaded sections which are passed through apertures provided for them in the ends of the plates, the plates being secured to the rods by suitable nuts 34a threaded on the rods. The rods, at their upper ends, are provided with U-shaped supporting members 35. The base of the members 35 are provided with apertures through which the rods 34 are passed and the rods at their upper ends are provided with heads 36 received between the legs of the supports 35, as shown in Fig. 2. The legs of the supports are secured to angle members 37 by means of cotter pins 38. The angle members 37 are rigidly secured to the top wall, as will be pointed out in greater detail hereinafter.

In view of the foregoing arrangement, it will be observed that the heating inserts 24 and 25 are supported below the apertures 21 provided in the top wall 11 so that the upper edges of the inserts are spaced somewhat from the lower surface of the top wall. This removes the top edges of the inserts from direct thermal contact with the top wall or plate 11 of the table, and thereby obviates an abnormally high temperature rise in the top wall. If the inserts directly contacted the top plate and were not separated from it by a relatively large space, as shown in the drawings, heat would be conducted from the heating elements of the inserts up through their massive and good heat conducting walls to the top plate. This would result in a high temperature condition in the top plate which would cause excessive heating of the food at the upper side walls of the food receptacles which are in direct thermal contact with the top plate, and moreover, the high temperature condition in the top plate would be undesirable since it frequently comes into contact with the person of the attendant. The spaces between the upper edges of the food containers 12–15 and the top plate is closed at the sides of the inserts by means of flanges 41. These flanges may conveniently be applied by forming them as the legs of an elongated U-shaped member 42 (Figs. 2 and 4), which is arranged in an inverted position as shown in these figures, and which spans the space between the adjacent receptacles 12 and 13, and 14 and 15, so that the legs 41 extend down into the food inserts in overlapping relation, as shown, between the inserts and the associated food containers. The base of the U-shaped member 42 is rigidly secured to the top plate 11 in any suitable manner, as by means of spot welding. Preferably, the edges of the plate 11 at the sides of the openings 21 will be soldered to the U-shaped member 42, as indicated by the numeral 43. This provides a smooth, even rounded edge for the openings 21. The vertical spaces between the food inserts and the top plate at the ends of the openings are closed by means of suitable angle members 44, which, as shown in Fig. 4, extend transversely across the ends of the openings and are united at their ends to the ends of adjacent legs or flanges 41 by means of soldered or similar joints 45. Likewise, the upper flanges of these angle members are soldered or otherwise secured to the top plate 11 at the edges of the openings, as indicated by the numeral 46. The body of the top plate is welded to these flanges. The flanges 41 and 44 co-operate to form a continuous wall extending down into the food inserts and closing the spaces between these inserts and the top plate 11. If desired, the screws 30 may be directed through the flanges and threaded into the inner sides of the inserts to secure them in proper positions in their casings, rather than through the casings.

The spaces between the warming inserts 25 and the top wall 11 are closed by circular flanges 47 which are spot welded or otherwise suitably secured to the under surface of the top plate, and which extend down into the inserts in overlapping relation with them, as clearly shown in Fig. 3.

In view of the foregoing arrangement, it will be understood that the food warming inserts 24 and 25 are detachably secured to the top plate 11, and may be withdrawn from the cabinet for the purpose of replacement or repair merely by removing the plates 33a from their supporting rods 34 and taking the casings 26 and 27 out through the front doors 18.

The casings 26 and 27, as shown, support the warming inserts 24 and 25 relatively close to the associated food containers, but spaced somewhat from them so as to define relatively narrow air spaces 48 and 49, respectively, between the walls of the food containers and their warming inserts.

The supporting angle members 37 for the rods 34 are spot welded directly to the under sides of the bases of the U-shaped members 42, as clearly shown in Figs. 2 and 4.

The warming inserts are heated by means of suitable sheathed heating elements 50 preferably having substantially a U-shape (Fig. 6). The heating elements 50 are in direct physical contact with the inserts and preferably will be embedded in the bottom walls of the inserts, as clearly shown in Figs. 2 and 3. The bottom walls are provided with relatively large protuberances or bosses 51 formed integrally with the bottom walls about the heating elements, as shown. While the heating elements 50 may be of any suitable construction, I prefer to use sheathed elements such as described and claimed in United States patent to C. C. Abbott No. 1,367,341, dated February 1, 1921. As there described, the heating elements comprise a helical resistance conductor 52 mounted in a metallic sheath 53 and supported in spaced relation with reference to the sheath by a compacted layer of heat refractory electrically insulating material 54, such as magnesium oxide.

Each heating element 50 is controlled by means of a suitable temperature control device 55 which in the main will be arranged substantially in accordance with the temperature control device described and claimed in the copending application of W. J. Ettinger and Nicholas Miller, Serial No. 759,932, filed December 31, 1934, and assigned to the same assignee as this invention. The control device, as shown, comprises a bimetallic thermostat bar 56 having one end secured to a support 57 and its other end free to move in response to changes in temperature. The free end carries a bridging contact 58 which co-operates with spaced fixed contacts 59 (only one of which is shown in Fig. 5) connected in the circuit of the heating element. The contacts 59 are secured to a supporting member 60 which is pivotally mounted to the support 57. Interposed between a knife-edge bearing 61 on the support 60 and the free end of the bimetal bar is a suitable snap spring 62 arranged to move the switch quickly between its open and closed positions. A suitable stop 63 is provided for the bimetallic bar in the open position of the switch.

The support 57 is secured in direct thermal conducting relation with the bottom wall of the warming insert by means of a suitable screw 64. As shown, the bottom wall is provided with a depending boss 65 formed integrally with the bottom wall and arranged to support the thermostat in proper relation to the bottom wall.

The temperature setting of the control device is adjusted by varying the position of the snap spring 62 with reference to the fixed end of the thermostat bar 56. This is accomplished by means of a suitable adjusting rod 66 threaded into the base 57, as shown, and carrying a compression spring 67 bearing on the movable support 60 so as to hold the support 60 against an abutment 67a on the rod; when the rod is turned, it varies the position of support 60 and hence of the spring 62. The rod further carries a suitable stop arm 68 which engages a stop pin 69 at the opposite ends of the range of adjustment of the device.

Thus far described, the temperature control device 55 is substantially the same as that described and claimed in the above-mentioned copending application of W. J. Ettinger and Nicholas Miller.

Suitable means are provided for adjusting the temperature rod through the openings 21 provided in the table top 11. For this purpose, a suitable adjusting plug 70 is mounted in a recess 71 provided for it in the bottom wall of the associated food insert. This plug is hollow, as shown, and receives the upper end of the rod 66. The walls of the plug are provided with slots 72 opposite each other and arranged to receive a pin 73 provided on the upper end of the rod. The plug is provided with an extension 74 directed upwardly through an aperture provided in the bottom wall of the insert and on its upper end there is mounted an adjusting arm or lever 75, which, as clearly shown in the drawings, is readily accessible to the attendant when the food containers are withdrawn. Preferably, the arm 75 will be arranged to move in a circular recess 76 provided for it in the bottom wall of the insert. Associated with the arm 75 are suitable numerals (Figs. 1 and 2) indicative of the temperature settings of the device ranging from the low temperature setting, indicated by numeral 1, to the high temperature setting, indicated by the word "High."

As pointed out above, adjustment of the arm 75 varies the position of the rod 66, and hence, the position of the support 60 and spring 62. This, as pointed out in detail in the above-mentioned copending application of Ettinger and Miller, varies the temperature setting of the control device. When the arm 75 is moved through its low temperature setting positions to the position indicated "Off", the switch is mechanically opened. For this purpose, a stop 77 is mounted on the fixed support 57 arranged in the path of a member 78 carried by the bimetal blade 56. As pointed out in detail in the above-mentioned Ettinger and Miller application, when the arm 75 is moved to the "Off" position, the support 60 will have been moved upwardly to such a position that the member 78 will have engaged the stop 77 to open the switch.

Thus, each food insert is provided with an independent adjustable temperature control responding to the temperature of the insert, and hence, to the temperature of the food in the associated container.

A suitable master switch 79 (Fig. 8) is provided to energize and de-energize the warming table.

In Figs. 9 and 10 there is illustrated a modified form of this invention. As there shown, only the relatively large rectangular inserts are used. In these figures, a large insert is designated by the numeral 79. The insert is mounted in a casing 80, and is supported by means of a flange 81 extending down into the casing through a top opening 82. The insert is heated by an electric heating unit 83 cast in the bottom, and the temperature of the insert is controlled by a thermostat similar to that shown in the first form and having an adjusting arm 84. The bottom of the insert is closed by a casing 85.

As shown in Fig. 9, the large insert may be used to warm a number of jars 86 similar to the jars 16 of the first form, or as shown in Fig. 10 may be used to warm a large pan 87, similar to the pan 15 of the first form. When the insert is used as in Fig. 9, a top plate 88 is employed having spaced apertures 89 for the reception of the jars 86. And when these jars are used, the foods placed in them should be such that they require about the same warming temperature.

Preferably and as shown, a heat insulation layer 90 will be provided around the walls of the casing 85, and the flange 81.

The provision of the relatively massive good heat conducting food insert covering the bottom and side walls of each food container, and of a heating element embedded in the insert provides a heating unit which uniformly distributes the heat generated in the heating element to the walls of the associated food container.

The air spaces 48 and 49 between the food containers and the inserts further insures a uniform distribution of heat from the inserts to the food containers, and eliminates localized hot spots in the food receptacles, which might be present if the food containers were permitted to contact the inserts directly.

The provision of a separate temperature control for each insert provides means whereby the various food containers can be held at different constant temperatures. This is highly desirable because various foods should be held at different temperatures for the best results. For example, meat should be held at about 185° F., whereas cooked vegetables should be held at temperatures of approximately 165° F.; such foods as hot fudge and the like should be held at lower temperatures, as 120° F.

It is also to be noted that I provide a relatively simple and inexpensive means for supporting the warming inserts in proper relation to the food receptacles, this means providing for removal and reapplication of the warming inserts when repairs or replacements become necessary.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. In a food warming table having a removable receptacle for receiving an edible, a heating body having walls enveloping at least a portion of the walls of said receptacle, means for heating said body, and a temperature responsive device controlling said heating element to hold a selected temperature in said heated body having an adjustable element located in a recess provided for it in the upper surface of the bottom wall of said heating body under the bottom wall of said receptacle so as to be accessible when said receptacle is removed.

2. In a food warming table having a top plate with an aperture therein for receiving a food receptacle, a heating insert for said receptacle positioned below said opening having relatively massive and good heat conducting walls for heating the walls of the food receptacle when it is received in said opening, an electrical heating element in thermal relation with said walls of said insert, a temperature responsive element controlling said heating element located below the bottom wall of said insert and in thermal relation with it and having a temperature adjustment element extending upwardly to a point where it may be adjusted from above without removing said insert from its heating position below said opening.

3. In a food warming table having a removable food receptacle directed through an aperture provided for it in the top of the table, a metallic insert formed of good heat conducting material beneath said receptacle having a shape corresponding to the shape of that part of the receptacle below the top of the table and spaced from the receptacle to define an air space between the receptacle and insert, a heating element associated with the insert, a thermostat beneath the insert in thermal relation with it controlling the heating element in accordance with the temperature of the insert, and a temperature adjustment element for said thermostat directed upwardly through the insert and having an adjustment member between the insert and the receptacle accessible for adjustment when the receptacle is removed.

4. An electrically heated warming table for restaurants, cafeterias, hotels and the like comprising a top having a plurality of food receptacles directed through apertures provided for them in said top, a plurality of metallic inserts formed of good heat conducting material beneath said receptacles respectively and having shapes corresponding to the walls of their associated receptacles and spaced slightly from the receptacles to define relatively narrow air spaces between the receptacles and inserts, a separate electrical heating element associated with each metallic insert, a thermostat beneath each metallic insert in direct thermal relation therewith controlling said heating element in accordance with the temperatures of said insert, and a temperature adjustment member for said thermostat directed upwardly through said insert having an adjustment knob between the insert and receptacle accessible for adjustment when said receptacle is removed.

5. In a warming table, a removable food receptacle, a heating body beneath said food receptacle, a heating element for said heated body, a temperature control device beneath said body controlling said heating element responsively to the temperature of said body, and a temperature adjusting arm for said thermostat located above said body so as to be accessible when said food receptacle is removed, said body being provided with a recess in its upper surface receiving said adjusting arm and providing for movement of said arm through its complete range of adjusting movement.

6. A warming table comprising a top plate having an opening therein, a food container inserted through said opening, a heating member having relatively massive bottom and side walls around the bottom and side walls of said container that extend down through said opening, said walls being formed of a material having a relatively good heat conductivity, and the upper edges of the massive side walls terminating at a level below said top plate so that the transfer of heat to said food container is substantially terminated at said point below said top plate, a flange secured to said top plate extending downwardly from the edges of said opening into said heating member in overlapping relation with it to close the space between said top wall and said heating member, and means for heating the walls of said heating member.

7. A warming table comprising a top plate having an opening therein, a food container inserted through said opening and suspended from said top plate, a heating member having relatively massive good heat conducting bottom and side walls around the bottom and side walls of said container that extends down through said opening, the corresponding bottom and side walls of said heating member and said container being out of contact so that air spaces are formed between them, electrical heating means for applying heat to said relatively massive and good heat conducting walls of said heating member for heating the air in said air spaces, and means supporting said heating member with the edges of its massive side walls spaced from said top plate so as to obviate excessively high temperatures in said top plate.

8. A food warming table having a top plate with an opening therein, a receptacle for receiving an edible inserted through said opening and having a section of the upper end portion of the side walls resting on the top plate to support said receptacle, a heat conducting body having relatively massive and good heat conducting walls associated with those of said receptacle to envelop sections of the bottom and side walls of the receptacle, means for heating the walls of said heat conducting body, and the walls of the body in their entirety being spaced from the corresponding walls of the receptacle to leave an air space between them, and the upper end of said walls of said heat conducting body terminating at a point below said top plate so that the transfer of heat from said heat conducting body to said air space is substantially terminated at said point to thereby obviate excessive temperature rise in said top plate and in the upper side walls of said food receptacle.

9. A food warming table having a top plate with an opening therein, a receptacle for receiving an edible inserted through said opening and having a section on the upper end portion of its side walls resting on the top plate so as to support the receptacle, a heat conducting body having relatively massive and good heat conducting walls associated with those of said receptacle to envelop sections of the bottom and side walls of the receptacle, a heating element for applying heat to the bottom wall of said heat conducting body, the heat imparted to said bottom wall being conducted by the massive good heat conducting walls up through the side walls of the body, the walls of the body being spaced from the corresponding walls of the receptacle to leave an air space between them and said walls applying heat to the air in this space to heat the contents of the edible container, and the top edges of said massive side walls terminating at a point spaced below the top plate so that the transfer of heat to said air space is substantially terminated at said point to thereby obviate excessive temperature rise in the top plate and in the upper side walls of the edible receptacle.

10. A warming table comprising a top plate having openings therein arranged side by side, pan-shaped heating inserts below said openings having side walls extending upwardly to a point somewhat below said openings, substantially inverted U-shaped members below said top plate spanning the space between adjacent inserts and having their legs extending down into said inserts, flanges joining the side edges of said legs together, means for heating said inserts, and food receptacles inserted through said openings into said inserts.

11. A warming table comprising a top plate having an opening therein, a food container inserted through said opening, a heating member having bottom and side walls around the bottom and side walls of said container that extends down through said opening, the upper edges of the side walls of said heating member being located below said top wall, a flange secured to said top plate extending downwardly from the edges of said opening into said heating member in overlapping relation with it to close the space between said top wall and said heating chamber, means attaching the upper edge of said heating member to the lower edge of said flange, and a casing attached to said upper edge of said heating member housing the bottom and side walls of said heating member, and a heating element in thermal relation with said heating member.

JACOB L. SHROYER.